US010162046B2

(12) United States Patent
Millar et al.

(10) Patent No.: US 10,162,046 B2
(45) Date of Patent: Dec. 25, 2018

(54) SYSTEM AND METHOD FOR DETECTING BLOCKAGE IN AN AUTOMOTIVE RADAR

(71) Applicant: Valeo Radar Systems, Inc., Hudson, NH (US)

(72) Inventors: Jeffrey Millar, Mont Vernon, NH (US); David Insana, Manchester, NH (US)

(73) Assignee: VALEO RADAR SYSTEMS, INC., Hudson, NH (US)

( * ) Notice: Subject to any disclaimer, the term of this patent is extended or adjusted under 35 U.S.C. 154(b) by 422 days.

(21) Appl. No.: 15/072,678

(22) Filed: Mar. 17, 2016

(65) Prior Publication Data
US 2017/0269196 A1   Sep. 21, 2017

(51) Int. Cl.
*G01S 13/44* (2006.01)
*G01S 7/40* (2006.01)
*G01S 13/93* (2006.01)

(52) U.S. Cl.
CPC .............. *G01S 7/4026* (2013.01); *G01S 7/40* (2013.01); *G01S 13/449* (2013.01); *G01S 13/931* (2013.01); *G01S 2007/4039* (2013.01)

(58) Field of Classification Search
CPC ........ G01S 7/4026; G01S 7/40; G01S 13/449; G01S 13/931; G01S 2007/4039–2007/4043
See application file for complete search history.

(56) References Cited

U.S. PATENT DOCUMENTS

| 5,959,570 A | 9/1999 | Russell |
| 6,469,659 B1 | 10/2002 | Lajiness et al. |
| 6,611,227 B1 | 8/2003 | Nebiyeloul-Kifle et al. |
| 7,973,701 B2 | 7/2011 | Lohmeier et al. |
| 2015/0070207 A1 | 3/2015 | Millar et al. |
| 2017/0059695 A1* | 3/2017 | Fetterman ............ G01S 7/4026 |

FOREIGN PATENT DOCUMENTS

| DE | 10149115 A1 | 4/2003 |
| DE | 102005013146 A1 | 9/2006 |

OTHER PUBLICATIONS

PCT International Search Report and Written Opinion dated Jun. 16, 2017 for International Application No. PCT/US2017/021338; 13 Pages.
U.S. Appl. No. 15/695,371, filed Sep. 5, 2017, Zeleny, et al.
PCT International Preliminary Report on Patentability dated Sep. 27, 2018 for Application No. PCT/US2017/021338; 8 Pages.

* cited by examiner

*Primary Examiner* — Matthew M Barker
(74) *Attorney, Agent, or Firm* — Daly, Crowley, Mofford & Durkee, LLP

(57) ABSTRACT

A radar sensor for use within a vehicle includes blockage detection functionality. In at least one embodiment, the radar sensor collects information on stationary infrastructure around the vehicle. The infrastructure information may be used to generate a Doppler Monopulse Image (DMI) or other graph for the sensor. A clutter ridge within the DMI or other graph may be analyzed determine a blockage condition of the sensor (i.e., unblocked, partially blocked, or fully blocked).

12 Claims, 10 Drawing Sheets

SYSTEM AND METHOD FOR DETECTING BLOCKAGE IN AN AUTOMOTIVE RADAR

FIELD

Subject matter disclosed herein relates generally to radio frequency (RF) systems and, more particularly, to vehicle radar systems for detecting objects in the vicinity of a vehicle.

BACKGROUND

As is known in the art, the existence of foreign matter or objects (e.g., mud or snow) on a radar such as an automotive radar sensor of the type described in U.S. Pat. No. 5,959,570 can impact the accuracy and reliability of the radar. For example, the foreign matter or objects may undesirably block one or more portions of the radar sensor transmit and/or receive antennas and in particular may block portions of the RF energy propagating to and from the transmit and receive antennas of the radar sensor.

Such blockage may, for example, be the result of an accumulation, over a period of time, of foreign matter or objects in the region of an antenna aperture. Such foreign matter may be caused for example by environmental conditions such as temperature, humidity, ice, rain, and the like. Such blockage can degrade, or in extreme cases even prevent, proper operation of the automotive radar sensor. For example, blockages can result in reduction of signal strength and/or distortion of target angles. If the foreign matter accumulates over time, there is a corresponding gradual decrease in sensor system performance over time. Since the accumulation is gradual, it is sometimes relatively difficult to detect the existence of antenna blockage due to the gradual accumulation of foreign matter and corresponding gradual decrease in radar sensor performance.

As is also known, some prior attempts to detect radar blockage include analyzing statistics from passing objects (e.g., passing vehicles). Examples of systems and methods for blockage detection utilizing statistics related to passing objects to can be found in U.S. Pat. No. 7,973,701.

SUMMARY

It is appreciated herein that existing blockage detection solutions may be limited in one or more respects. For example, gathering statistics on targets may require several minutes of data gathering and analysis. In accordance with the concepts, systems and techniques described herein, it has been recognized that a tradeoff exists between the speed at which a blockage may be detected after an initial startup and the amount of data gathered and accuracy of the algorithm, which may lead to false blockage reports. As another example, the accuracy of existing blockage detection solutions may be limited by variations in signal strength from passing targets resulting from variations in the target size and shape angle, variations in the radar unit or host vehicle, and temperature variations. It would be desirable to provide faster and more accurate radar blockage detection.

Described herein are blockage detection techniques and structures that use reflections from static infrastructure (e.g., reflections from curb, grass, guardrail, bushes, trees, cracks in the road, etc.). Static infrastructure reflections have a unique signature, referred to as a "clutter ridge," that differs from noise. The clutter ridge rapidly forms (e.g. in some instances within seconds of driving). Thus, blockage detection can occur almost immediately upon startup of a vehicle. Additional reflections are accumulated over time to improve accuracy (e.g., to reduce the chance of detecting a false blockage).

According to an embodiment of the disclosure, a method for detecting radar sensor blockage in a vehicle radar sensor comprises: collecting sensor data using the radar sensor as the vehicle travels past stationary structures; generating a plot of normalized Doppler versus monopulse angle using the collected sensor data, wherein the plot includes a clutter ridge comprising points representative of the stationary structures, wherein the plot indicates signal magnitude at different points of normalized Doppler and monopulse angle; and analyzing the plot to detect if the radar sensor is blocked.

In some embodiments, generating a plot of normalized Doppler versus monopulse angle comprises generating a plot based on range/Doppler bins associated with the collected sensor data. In certain embodiments, analyzing the plot to detect if the radar sensor is blocked comprises detecting a partial blockage or a full blockage. In one embodiment, analyzing the plot to detect if the radar sensor is blocked comprises analyzing the plot in azimuth for several normalized Doppler values.

In various embodiments, analyzing characteristics of the clutter ridge to detect if the radar sensor is blocked comprises calculating a one or more quality metrics for the clutter ridge. The quality metrics may include at least one of: calculating an average peak magnitude in azimuth; calculating an average variance of the clutter ridge in azimuth; and calculating average stability of peak magnitude in azimuth. The method may further comprise: comparing each of the quality metrics to a respective threshold value to detect if the radar sensor is blocked.

In certain embodiments, the vehicle includes a Controller Area Network (CAN) and the method further comprises providing a signal to the CAN in response to detecting a radar sensor blockage. In some embodiments, the vehicle includes a human/machine interface (HMI) and the method further comprises providing a signal to the HMI in response to detecting a radar sensor blockage.

According to another aspect of the disclosure, a vehicle radar system comprises: an RF transmitter to generate radio frequency (RF) transmit signals; a transmit antenna to transmit the RF transmit signals; one or more antennas to receive return signals representing reflections of the RF transmit signals from objects and structures within a region of interest about the vehicle; first and second analog-to-digital converters to digitize signals associated with the first and second receive antennas, respectively; and a blockage detection processor. The blockage detection process may be configured to: collect sensor data using the radar sensor as the vehicle travels past stationary structures; generate a plot of normalized Doppler versus monopulse angle using the collected sensor data, wherein the plot includes a clutter ridge comprising points representative of the stationary structures, wherein the plot indicates signal magnitude at different points of normalized Doppler and monopulse angle; and analyze the plot to detect if the radar sensor is blocked.

In some embodiments, the blockage detection processor is configured to generate a plot based on range/Doppler bins associated with the collected sensor data. In one embodiment, the blockage detection processor is configured to detect a partial blockage or a full blockage. In certain embodiments, the blockage detection processor is configured to analyze the plot in azimuth for several normalized Doppler values.

In various embodiments, the blockage detection processor is configured to calculate a one or more quality metrics for the clutter ridge. The quality metrics may include at least one of: an average peak magnitude in azimuth; an average variance of the clutter ridge in azimuth; and average stability of peak magnitude in azimuth. In one embodiment, the blockage detection processor is further configured to compare each of the quality metrics to a respective threshold value to detect if the radar sensor is blocked.

In some embodiments, the vehicle includes a Controller Area Network (CAN) and the blockage detection processor is further configured to provide a signal to the CAN in response to detecting a radar sensor blockage. In certain embodiments, the vehicle includes a human/machine interface (HMI) and the blockage detection processor is further configured to provide a signal to the HMI in response to detecting a radar sensor blockage.

BRIEF DESCRIPTION OF THE DRAWINGS

The foregoing features may be more fully understood from the following description of the drawings in which.

The drawings are not necessarily to scale, or inclusive of all elements of a system, emphasis instead generally being placed upon illustrating the concepts, structures, and techniques sought to be protected herein.

DETAILED DESCRIPTION

Techniques and systems described herein relate to vehicle radar systems and methods for detecting the existing of a full or partial blockage of a radar. In various embodiments, techniques and structures are provided that allow partial and/or full blockage detection of an automotive radar using measurements associated with infrastructure which is substantially stationary relative to a vehicle in motion hereinafter referred to as "stationary infrastructure" or more simply "infrastructure." The infrastructure measurements may begin to be taken when, for example, a vehicle starts up and begins to move. Collected infrastructure information is usable for blockage detection regardless of signal strength. For this reason, vast amounts of useable data can be collected in a relatively short time period, decreasing the time required for blockage detection compared to existing solutions. Although described below primarily in the context of automobiles, it should be appreciated that the radar systems and techniques described herein may be used in connection with a wide range of different vehicle types including, but not limited to, land-based, air born and water-based vehicles including, but not limited to, trucks, cars, motor vehicles, boats and unmanned aerial vehicles (UAVs).

The infrastructure related information collected by the sensor may be used to generate a Doppler Monopulse Image (DMI). Most of the information plotted on the DMI will be concentrated about a line known as a "clutter ridge" which takes into account all or some of information about the mounting angle of the sensor, the angle distortion of the sensor and its mounting environment, and the quality of the angle measurement process. The presence of a well-defined clutter ridge can indicate that a sensor is not blocked.

In some embodiments, the clutter ridge of the DMI may also be used to develop statistical information (e.g., peak data variances, quality statistics, etc.) that can be used to gauge, for example, the quality or reliability of the collected information. This quality and reliability information may then be used to, for example, determine whether blockage detection is feasible and, if so, to determine whether a partial or full blockage exists.

Figure 1A:
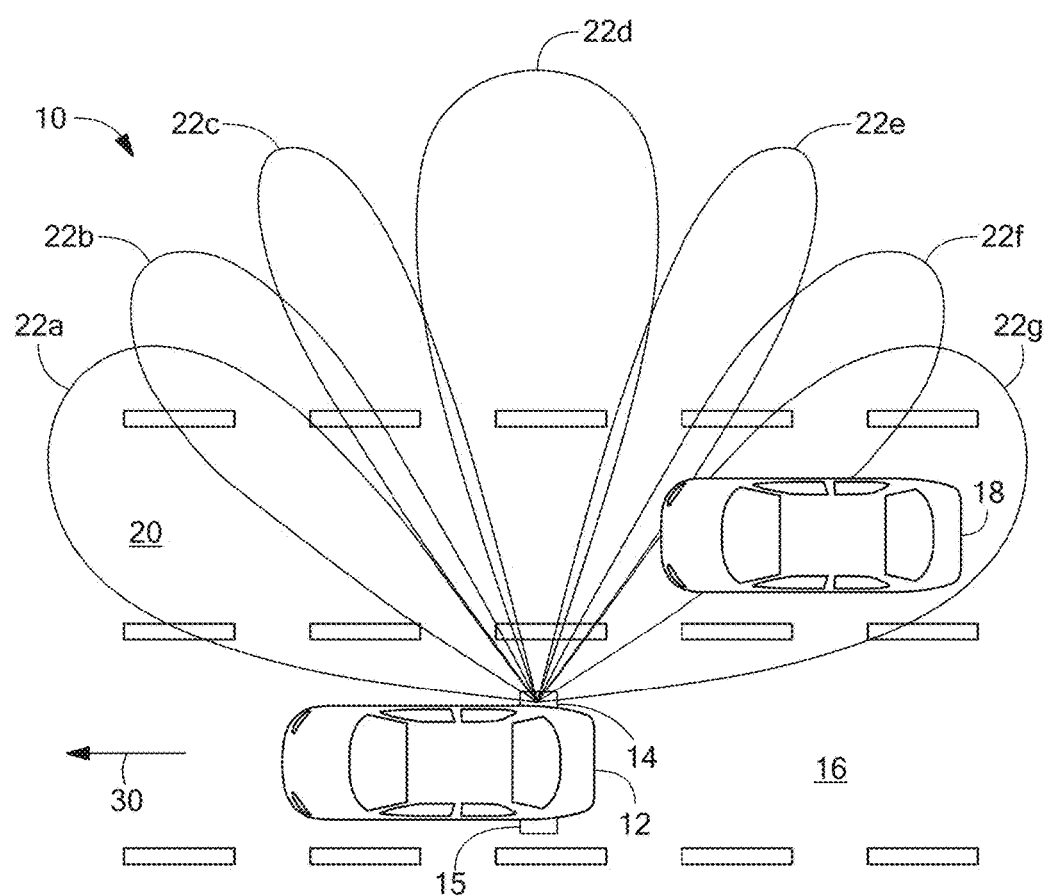
FIG. 1a is a diagram illustrating a vehicle radar-sensing scenario within which features described herein may be practiced.

FIG. 1a is a diagram illustrating a vehicle radar-sensing scenario 10 within which features described herein may be practiced. As shown, a first vehicle 12 is traveling within a lane 16 of a highway in a direction 30. A second vehicle 18 is traveling within an adjacent lane 20 of the highway in the same direction 30. The driver of the first vehicle 12 will want to be aware of the presence of the second vehicle 18 to, for example, avoid collision. However, the second vehicle 18 may be within a "blind spot" of the driver of the first vehicle 12 that hinders the driver's ability to see the second vehicle 18. To prevent potential problems, the first vehicle 12 may be equipped with one or more radar sensors 14, 15 mounted thereon (e.g. on the sides thereof) that are capable of sensing and tracking other vehicles in the vicinity of the first vehicle 12. The sensors 14, 15 may be capable of measuring, for example, the position (e.g., angle) and speed of the other vehicles. The sensors 14, 15 may be coupled to other electronics within the first vehicle 12 that allow the sensors 14, 15 to, for example, warn the driver of the presence and location of other vehicles about the first vehicle 12 (e.g., a display, a speaker for an alert signal, etc.). Thus, the sensors 14, 15 are sometimes referred to as side object detection (SOD) systems. A central controller may also be provided within the first vehicle 12 to coordinate the operation of multiple sensors within the vehicle in some embodiments.

The sensors 14, 15 may sense the presence of other vehicles and determine information about those vehicles using radio frequency (RF) signals. For example, one or more RF signals may be transmitted into a region of interest about the first vehicle 12 (e.g., a side region) by the sensor 14. If a target is present in this region, a portion of the transmitted RF signal may be reflected back by the target toward the sensor 14. The sensor 14 may then receive and analyze the return energy to determine information about the target vehicle. As used herein, the word "target" is used to describe objects of interest to the radar sensor for which data is desired (e.g., other moving vehicles, etc.). The word "infrastructure" is used to describe stationary objects and structures in the vicinity of a vehicle of interest (i.e., the vehicle carrying the radar sensor) which are substantially stationary relative to a moving vehicle in which the radar sensor is disposed. The radar sensor may be able to distinguish infrastructure detections from moving vehicle detections based on Doppler shifts.

As described above, the sensors 14, 15 may transmit one or more RF signals toward a region of interest to detect nearby targets. As shown in FIG. 1a, in some embodiments, the sensor 14 may utilize multiple transmit beams 22a, 22b, 22c, 22d, 22e, 22f, 22g to cover a region of interest (e.g., the entire side region next to the first vehicle 12). Although illustrated with seven transmit beams, it should be appreciated that any number may be used in different embodiments. In some embodiments, the sensor 14 may use only a single transmit beam to cover a region of interest. When multiple transmit beams are used, the beams may be activated in sequence or in some other predefined manner to transmit the RF signals. Depending on the location of targets, if any, some transmit beams may result in target return energy being received at the sensor 14 and other beams may not. Target return energy will be analyzed by the sensor 14 to determine information about corresponding targets. Tracking units may also be provided within the sensors 14, 15 to track detected targets.

As described above, in various embodiments, a radar system may collect measurements of stationary infrastructure about a vehicle using the sensor, while the vehicle is in motion. The collected information may be processed and used to develop a Doppler Monopulse Image (DMI), which can be analyzed to detect partial and full blockages of a radar sensor.

Figure 1B:
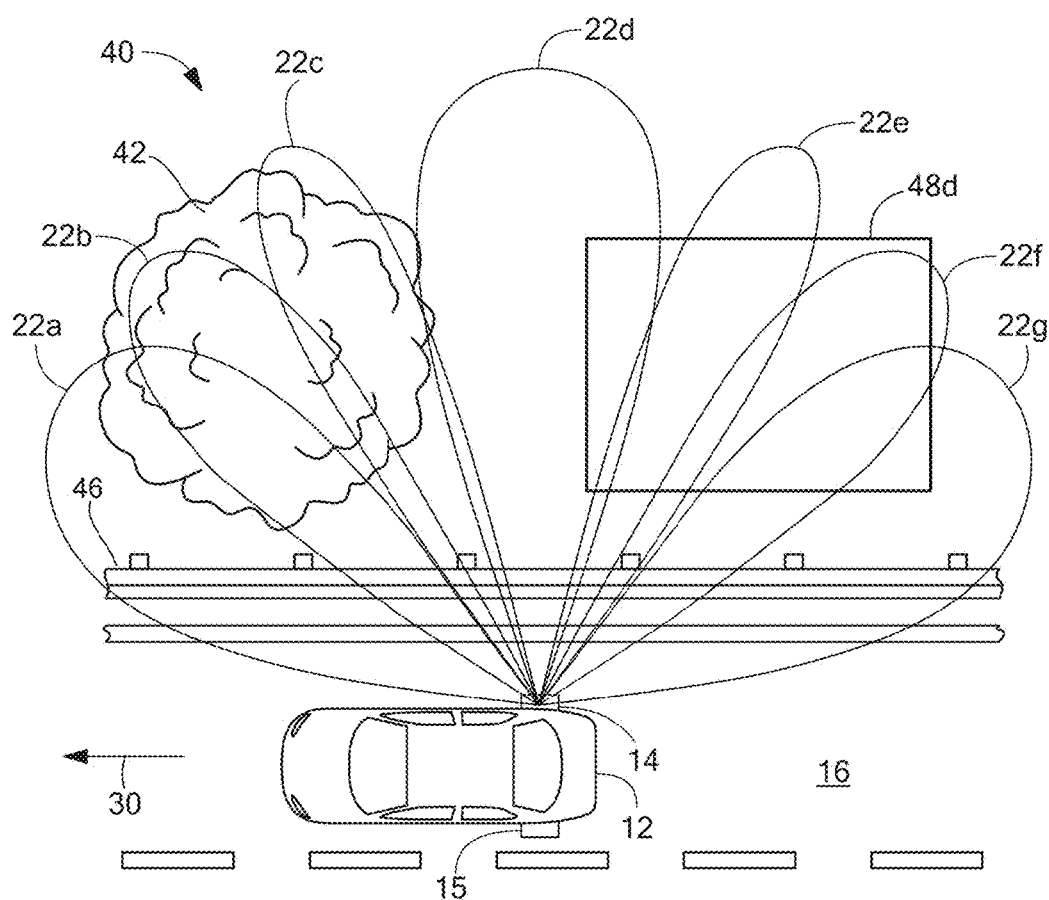
FIG. 1b is a diagram illustrating another vehicle radar-sensing scenario illustrating the collection of infrastructure data by a sensor associated with a moving vehicle in accordance with an embodiment of the disclosure.

FIG. 1b is a diagram illustrating a vehicle radar-sensing scenario 40 illustrating the collection of infrastructure data by a sensor 14 mounted on a moving vehicle 12 in accordance with an embodiment. In the illustrated scenario 40, the vehicle 12 is moving in a direction 30 within a lane of a highway. It should be appreciated, however, that the blockage detection techniques described herein may be performed anywhere that the vehicle 12 is able to achieve at least a minimal speed and maximum yaw rate for at least a minimum time duration (e.g., in the range of about 1-15 seconds in one embodiment with a range of less than about 10 seconds being preferred).

The infrastructure may include any stationary objects or structures located in an area around the moving vehicle 12. In the scenario 40 of FIG. 1b, for example, the infrastructure includes a tree 42, a building 44, and a guardrail 46. Other examples of infrastructure include signs, fire hydrants, parked vehicles, lampposts, parking meters, telephone poles, fences, walls, curbs, grass, bushes, trees, and/or other structures.

Information may be collected about the infrastructure by transmitting RF signals toward the infrastructure and then receiving and processing return information. In some embodiments, RF signals may be transmitted toward the infrastructure using multiple different transmit beams 22a, 22b, 22c, 22d, 22e, 22f, 22g. In other implementations, a single beam may be used. The collected information may be used to generate a DMI, which may be used for blockage detection. As will be described in greater detail, other useful information may also be extracted from the DMI for use within the sensor to improve overall sensor operation. This may include, for example, quality and variance information that may be used to, among other things, determine when updates should be made to a tracking unit, such as a Kalman filter. In some embodiments, the collection of infrastructure information may be initiated just after vehicle starts up, when the vehicle first reaches a particular speed. Once initiated, the collection of infrastructure information may be rapid. This is because, in some implementations, virtually all collected information is used during the blockage detection process, regardless of signal strength. Thus, a large amount of data may be rapidly collected.

It should be appreciated that infrastructure data may be collected from any or all of multiple different sensors. For example, in FIG. 1b, infrastructure information could be collected from the sensor 15 mounted on the left side of the vehicle 12 as an alternative to, or in addition to, collecting information from the sensor 14 mounted on the right side of the vehicle 12. Separate DMI's may be generated and analyzed for each sensor. Thus, the techniques and structures described herein can be used to determine which of multiple different sensors are blocked.

Figure 2:
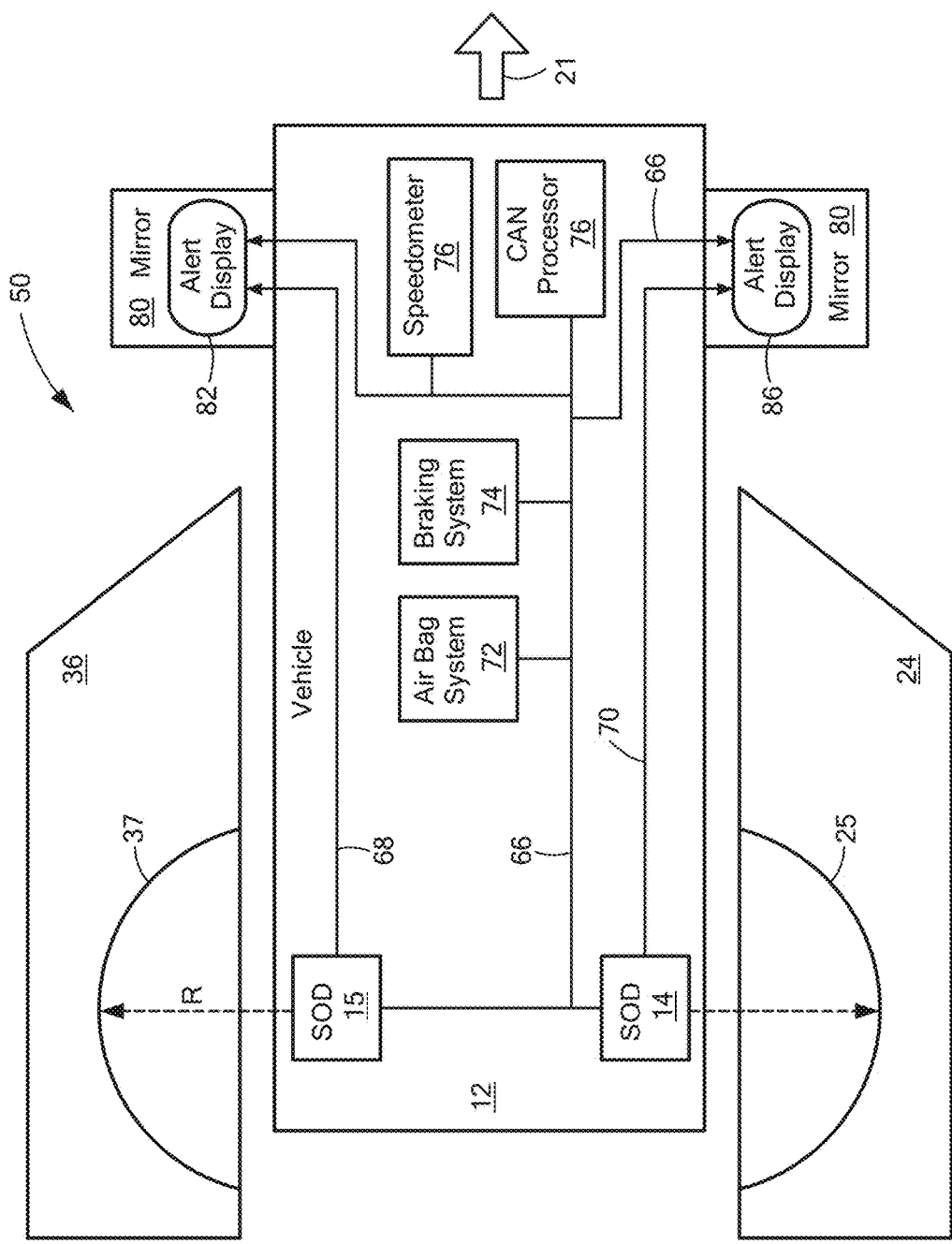
FIG. 2 is a block diagram of an automotive radar system according to an embodiment of the disclosure.

Referring to FIG. 2, an illustrative vehicle system 50 which may be the same as or similar to the vehicle systems included in vehicle 12 described above in conjunction with FIGS. 1a and 1b, includes vehicle systems such as SOD systems 14, 15, an air bag system 72, a braking system 74, and a speedometer 76.

Each one of the SOD systems 14, 15 is coupled to a Controller Area Network (CAN) processor 78 through a CAN bus 66. As used herein, the term "controller area network" is used to describe a control bus and associated control processor typically found in vehicles. For example, the CAN bus 66 and associated CAN processor 78 may control a variety of different vehicle functions such as anti-lock brake functions, air bags functions and certain display functions.

The vehicle 12 includes two side-view mirrors 80, 84, each having an alert display 82, 86, respectively, viewable therein. Each one of the alert displays 82, 86 is adapted or configured to provide a visual alert to an operator of a vehicle in which system 50 is disposed (e.g., vehicle 12 in FIG. 1) to indicate the presence of another vehicle in a blind spot of the vehicle. To this end, in operation, the SOD system 14 forms detection zone 24 and a virtual detection zone 25 and SOD system 15 forms a detection zone 36 and a virtual detection zone 37.

In one embodiment, VDZs 25, 37 are each provided having a substantially arc shape with an length of about 160 degrees and an arc radius of about 350 centimeters (cm) as measured from substantially the centerlines of the respective SODS 14, 15 (i.e. VDZ are provided having 160 degree wedge extending from SOD at center with radius of 350 cm). The VDZs 25, 37 may be provided having a radius which is greater or less than 350 cm. For example, radii of 250 cm or 450 cm may also be used. After reading the description herein, those of ordinary skill in the art will appreciate how to select a radius for a particular application. Furthermore, as mentioned above, in some embodiments VDZs 25, 37 may be provided having a shape which is different than an arc shaped (e.g. a rectangular, triangular, oval or irregular shape may be used). It should also be appreciated that VDZs need not have identical or substantially identical shapes. That is, in some applications it may be desirable to provide VDZ 25 having a first shape which substantially corresponds to one of an arc, rectangular, triangular, oval or irregular shape while VDZ 37 is provided 25 having a second different shape which substantially corresponds to a different one of an arc, rectangular, triangular, oval or irregular shape.

Upon detection of an object (e.g., another vehicle, a guard rail, a tree, a building and so forth) in the detection zone 24, the SOD system 14 sends an alert signal indicating the presence of an object to either or both of the alert displays 82, 86 through the CAN bus 66. In response to receiving the alert signal, the alert displays provide an indication through an indicator (e.g., a visual, audio, or mechanical indicator)

which indicates the presence of an object. Similarly, upon detection of an object in the detection zone 36 SOD system 15 sends an alert signal indicating the presence of another vehicle to one or both of alert displays 82, 86 through the CAN bus 66.

In other embodiments, the SOD system 15 may communicate the alert signal to the alert display 82 through a human/machine interface (HMI) bus 68. Similarly, SOD system 14 may communicate the alert signal to the other alert display 86 through another HMI bus 70. As used herein an alert signal may include an alert signal to turn on an alert or an alert signal to turn off an alert. As will be described below, the mere detection or lack of detection of an object in the detection zone 24, 36 may not necessarily generate an alert signal. Other circuitry and/or program code logic may be implemented within or external to the SOD to ensure that the alert signal is sent when certain criteria are met based upon the data received at the receiver 158.

Figure 3:
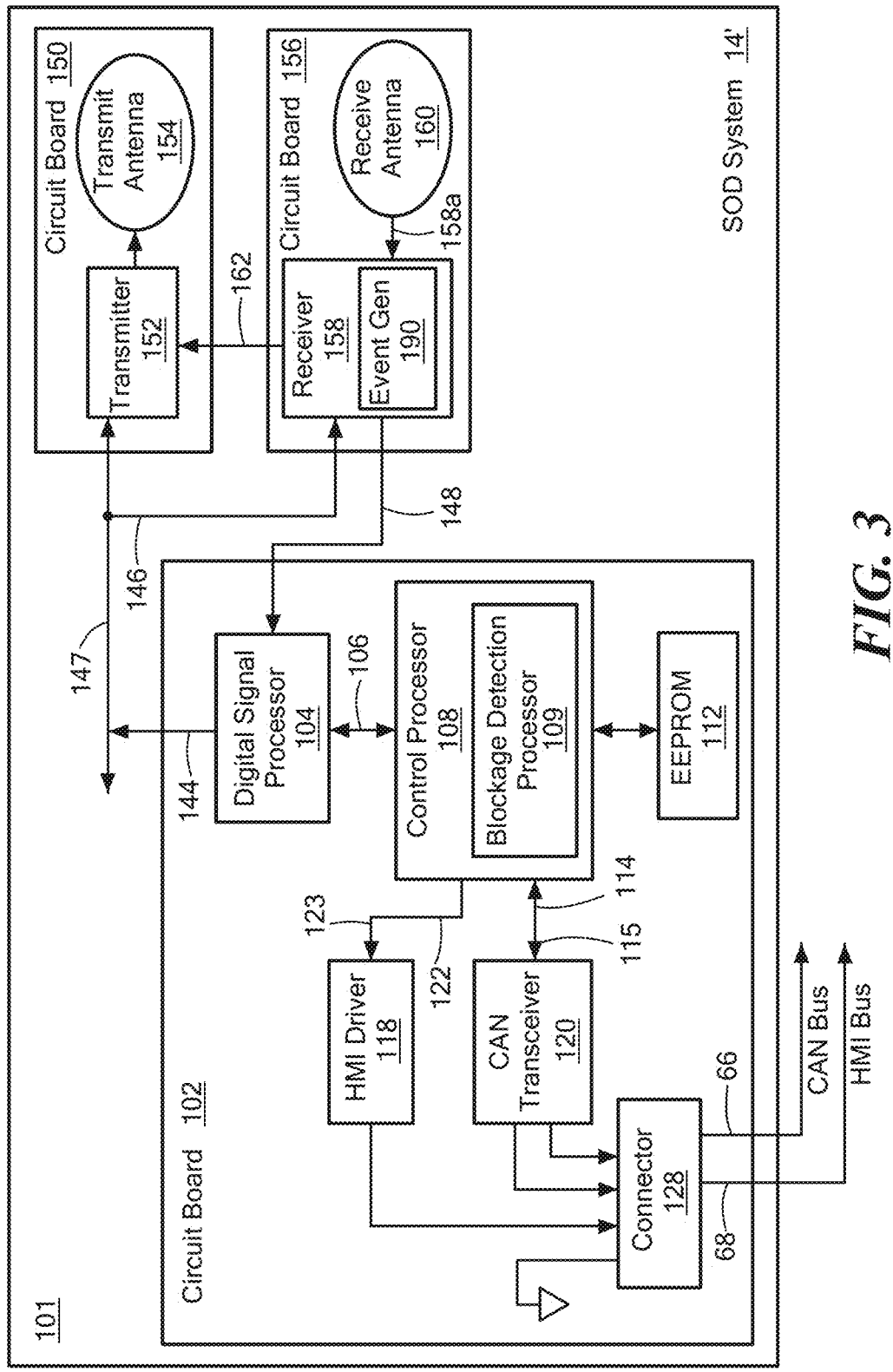
FIG. 3 a block diagram of a side object detection (SOD) system of a vehicle radar system in accordance with an embodiment of the disclosure.

Referring now to FIG. 3, a SOD system 14' which may be the same as or similar to SODs 14 and 15 described above in conjunction with FIGS. 1a, 1b, and 2, includes a housing 101 having a plurality of circuit boards 102, 150, 156 disposed therein. It should be appreciated that while any number of circuit boards can be used, in this embodiment, three circuit boards are used and the particular type of material from which each circuit board is provided is selected to satisfy all circuit performance and cost requirements. For example, circuit board 102 may be provided as a fiberglass circuit board; circuit board 150 may be provided as a low temperature co-fired ceramic (LTTC) circuit board or as a polytetrafluoroethylene (PTFE) circuit board 150; and circuit board 156 may be provided as an LTCC circuit board 156. Other materials may also be used for each circuit board as long as circuit performance and cost criteria are satisfied. Those of ordinary skill in the art will understand how to select a particular material for each circuit board depending upon a variety of factors including but not limited to technical (e.g., engineering) requirements and cost.

The circuit board 102 has disposed thereon a digital signal processor (DSP) 104 coupled to a control processor 108. In general, the DSP 104 is configured to perform signal processing functions, for example, fast Fourier transforms (FFTs) on signals provided thereto from the receiver. In some embodiments, the DSP 104 may be of a type described, for example, in U.S. Pat. No. 7,071,868.

The control processor 108 is also configured to perform digital functions, for example, to identify conditions under which an operator of a vehicle on which the SOD system 14 is mounted should be alerted to the presence of another object such as a vehicle in a blind spot or to determine whether a blockage condition exists. In some embodiments, the control processor 108 includes a blockage detection processor 109 configured to determine whether a blockage condition exists using techniques described below in conjunction with FIGS. 4 and 5.

The control processor 108 is coupled to a memory 112, which is here illustrated as an electrically erasable read-only memory (EEPROM) 112. Other types of memory may also be used. Memory 112 is adapted or configured to retain a variety of values including but not limited to calibration values. For example, control processor 108 receives calibration parameters related to counter and timer settings from external memory 112 (which may be provided as an EEPROM, for example) for use in determining whether a blockage condition exists. Other memories, including other read only memories, associated with processor program memory are not shown for clarity. The control processor 108 is coupled to a CAN transceiver 120, which is adapted or configured to communicate, via a connector 128, on the CAN bus 66.

Blockage detection signals 115, 123 can be provided to HMI driver 118 and/or CAN transceiver 120. In the case where blockage detection signal 123 is provided to HMI driver 118, the blockage detection signal 123 may propagate on the HMI bus 68 and can be electrically coupled to an icon which turns on to alert a driver to a blockage condition. Alternatively or additionally, if blockage detection signal 115 is provided to CAN transceiver 120, the blockage detection signal 115 propagates on the CAN bus 66 and can be electrically coupled to a screen display (e.g. a scrolling screen display) to alert a driver to a blockage condition. In some embodiments, a blockage detection signal 115/123 provides a bit or message on the bus 66/128 indicating either a partial or a full blockage.

The control processor 108 is also coupled to an optional HMI driver 118, which in turn is coupled via the connector 128, to the HMI bus 68. The HMI bus 68 may include any form of communication media and communication format, including, but not limited to, a fiber optic media with an Ethernet format, and a wire media with a two state format.

The circuit board 150 includes a radar transmitter 152 coupled to a transmit antenna 154. Transmitter 152 is also coupled to DSP 104 through an interface 147 and a bus 144. In one embodiment, the interface 147 is provided as a serial port interface (SPI) 147.

The circuit board 156 includes a receive antenna 160 coupled to a receiver 158. Receiver 158 includes an event generator which may be the same as or similar to the type described in PCT Application PCT/US2007/023019 published in the English Language on May 29, 2008 as WO 2008/063367. Receiver 158 is, in turn, coupled to the DSP 104 and to the transmitter 152. In some embodiments, the receiver 158 is coupled to the DSP 104 through a bus 146 which is coupled to interface 147 which in turn is coupled to bus 144 through the SPI 147 and a bus 146. The radar transmitter 152 and the radar receiver 158 may receive regulated voltages from a voltage regulator. The receiver 158 also provides RF signals to the transmitter 152 through a signal path 162.

In operation, the DSP 104 initiates one or more chirp control signals (also referred to as ramp signals) by providing a command signal to event generator 190 via signal path 148. In response to the command signal from the DSP, the event generator 190 generates the chirp control signals. Thus, the event generator removes the chirp control signal processing function from the DSP 104. In other embodiments the chirp generator may be located in the receiver 158. In still other embodiments, however, the event generator 190 can be located in other portions of the radar system 14' (FIG. 3).

It should be understood that by removing the control signal waveform responsibility from the DSP 104 and providing a dedicated event generator circuit which is separate from the DSP, the event generator may provide more comprehensive chirp control signals. This is because the DSP 104 must serve multiple and differing types of requests while the event generator serves only to generate control signals related to generation of the chirp control signals. Also, the required accuracy of the timing signals created by the event generator also precludes the event generator from being the direct responsibility of the DSP 104. Also, the DSP 104 is now freed from this time consuming activity, so it can now perform additional critical tasks in parallel.

Each chirp control signal has a start voltage and an end voltage. The chirp control signal is provided to a signal source. In response to the ramp signals, the signal source generates RF signals having waveform and frequency characteristics determined or controlled by the chirp control signal. The transmitter feeds the RF signals to the transmit antenna 154 which emits (or radiates) the RF signals as RF chirp radar signals. As used herein, the term "chirp" is used to describe a signal having a characteristic (e.g., frequency, amplitude, or any other characteristic or combinations of any characteristics) that varies with time during a time window. Typically, in those instances when the frequency of the signal is varied, each chirp has an associated start and end frequency. A chirp may be a linear chirp, for which the frequency varies in a substantially linear fashion between the start and end frequencies. The chirp may also be a non-linear chirp.

The DSP 104 initiates transmission of ramp signals by the event generator 190 for so-called major cycles. The DSP 104 causes the event generator to execute a pre-programmed set of actions, which will cause a signal source (e.g., a voltage-controlled oscillator or VCO) to be modulated accordingly, for each minor cycle in turn. A major cycle is a time period during which signals are received in a designated set of the receive beams 22a-22g. The designated set of receive beams may be all of the receive beams 22a-22g or the designated set of receive beams may be only some of the receive beams 22a-22g. A major cycle is comprised of one or more so-called minor cycles. A minor cycle is a period of time during which signals are received in a subset (e.g. one or more) of the designated set of receive beams.

As mentioned above, the DSP 104 causes the event generator 190 to execute for each minor cycle. Thus, for each major cycle, the DSP issues a so-called "go" command several times per major cycle. The event generator 190, in turn, provides controls signals or values in each minor cycle including the transmission of the ramp control signals (or more simply "ramp signals") in each minor cycle.

The transmit antenna 154 may be provided having one or a plurality of transmit beams. Regardless of the particular number of transmit beams, the transmit antenna 154 emits one or more RF chirp radar signals in one or more desired fields of view (e.g., summed or individually covering the detection zone 24 in FIG. 2). The transmit beams may be similar or different in antenna pattern and may be similar or different in fields of view. The fields of view of the transmit beams may overlap to varying extents, from completely overlapped to not at all overlapped.

The receive antenna system 160 may utilize one or a plurality of receive beams. The receive beams may be similar or different in antenna pattern and may be similar or different in fields of view. Like the transmit beams, the fields of view of the receive beams may overlap to varying extents, from completely overlapping to not overlapping at all. The SOD 14 in FIG. 1, for example, utilizes seven receive beams 22a-22g each of which overlaps at least one other beam.

Each of the receive beams receives return or echo radar signals, or otherwise generates and/or receives noise signals. Signals received through the receive beams are coupled to radar receiver 158. Radar receiver 158 receives the RF signals provided thereto from the antenna, down converts the received RF signals to an intermediate frequency (IF) signal, and provides an output signal on signal path 148. In addition to the frequency down conversion, the receiver 158 appropriately processes the RF input signals provided thereto from the receive antenna system 160 such that the output signals on the signal path 148 can be appropriately received and processed by the DSP 104.

The signal provided to the input of DSP 104 has a frequency content, wherein signal level peaks which occur at different frequencies correspond to detected objects at different ranges. The DSP 104 analyzes the signals provided thereto and identifies objects in a detection zone e.g. detection zones 24 or 36 of FIG. 2.

Some objects identified by the DSP 104 may be objects for which an operator of the first vehicle 12 (FIG. 1) has little concern and need not be alerted. For example, an operator of vehicle 12 may not, in some instances, need to be alerted or continuously alerted as to the existence of a stationary guardrail along the roadside. Thus, criteria additional to the presence of an object in or near the detection zone may be used to determine when an alert signal should be generated or terminated.

To utilize further criteria, the control processor 108 receives object detections on a bus 106 from the DSP 104. The control processor 108 applies a series of factors and characteristics (i.e., criteria used in addition to that used by DSP 104 to identify an object) to control generation of an alert signal and/or a blockage detection signal. For example, upon determination by the control processor 108, an alert signal or a blockage detection signal 115 may be generated and sent through a bus 114 to CAN transceiver 120 and communicated on the CAN bus 66. In the case of an alert signal, the signal is indicative not only of an object in the detection zone 24, but also is indicative of an object having predetermined characteristics being in the detection zone. In other embodiments, an alert signal or a blockage detection signal 123 may be communicated by control processor 108 on a bus 122 through the HMI driver 118 to the HMI bus 68. In the case of a blockage detection signal, the signal is indicative of the existence or the potential existence of a blockage which undesirably blocks portions of the RF energy propagating to and from the transmit and/or receive antenna of the SOD thereby affecting the effectiveness of the SOD system 14.

The circuit board 102, the circuit board 150, and the circuit board 156 are comprised of materials having known behaviors for signals within particular frequency ranges. It is known, for example, that fiberglass circuit boards have acceptable signal carrying performance at signal frequencies up to a few hundred MHz. LTCC circuit boards and PTFE circuit boards are known to have acceptable signal carrying performance characteristics at much higher frequencies. Thus, in the case where circuit board 102 is provided as a fiberglass circuit board and circuit boards 150, 156 are provided from LTCC and/or PTFE, circuits and circuitry which perform the lower frequency functions of the SOD system 14 are disposed on the circuit board 102, while circuits and circuitry which perform the functions having relatively high frequencies (e.g. above approximately 2 GHz) are disposed on the LTCC and on the PTFE circuit boards 150, 156, respectively. Nevertheless, suitable materials other than those specifically mentioned herein may be used.

As mentioned above, in various embodiments the SOD system 14' is configured to perform blockage detection using information collected from stationary infrastructure. This process can be better understood in terms of three areas of functionality (or "stages"): acquire, analyze, and apply.

During the acquire stage, data is collected corresponding to stationary infrastructure around the vehicle of interest. The data collection may take place when the vehicle of interest is moving within a particular speed range and may involve the receipt of radar return signals in the sensor and the generation of Doppler information. The collected infrastructure information may be used to develop a Doppler monopulse image (DMI) for the infrastructure. The process of collecting information from surrounding infrastructure may be repeated over and over again until enough information has been collected to form an adequate DMI.

During the acquire stage, return signal samples may be processed in a two-dimensional discrete Fourier transform (DFT), one example of which is the two-dimensional fast Fourier transform (FFT). For each receiver channel, the two-dimensional FFT will divide the received signal energy into a plurality of range/Doppler bins. As will be described in greater detail, the information within the various range/Doppler bins may be plotted to generate the DMI. In some embodiments, the two-dimensional FFT may be implemented within a programmable or reconfigurable digital processing device (e.g., DSP 104 of FIG. 3). In other embodiments, special FFT chips or processors may be used to provide the FFT processing.

For each received chirp, a first FFT operation may be performed that divides the signal into a plurality of range bins. Processing of all the chirps results in a two-dimensional array of range bins over time. Each row of range bins in the two-dimensional array is then processed in a second FFT. The second FFT converts the two-dimensional array of range bins over time into a two-dimensional array of range/Doppler bins. Each range/Doppler bin in the array corresponds to received energy having a particular Doppler shift that originated at a corresponding range within the region of interest. Each range/Doppler bin will have a corresponding magnitude (signal strength) and phase. There will be one two-dimensional array for each receive channel in the corresponding receiver. In one embodiment, the two-dimensional array includes 12 range bins and 8 Doppler bins resulting in 96 range-Doppler bins for each channel. In another embodiment, the two-dimensional array includes 80 range bins and 64 Doppler bins are used, resulting in 5120 total range/Doppler bins for each channel.

In some embodiments, a monopulse radar determines the angle-of-arrival (AoA) of a signal using the phase difference of received energy at two separate receive antennas. Signal energy is received from a target at an angle θ at two receive antennas that are separated by a distance D. Because the antennas are at different locations, the signal will travel an extra distance of $D_p = D \sin θ$ to reach antenna than to reach antenna. This causes a phase difference between the two received signals. This phase difference may be measured and used to calculate the angle of arrival θ of the corresponding signal.

As described above, using a series of returned chirp signals, a two-dimensional array of range/Doppler bins may be generated for each receive channel in the receiver. For each range/Doppler bin, monopulse angle information may be used to generate a DMI.

Monopulse angle (monopulse phase angle (MpA) or azimuth) represents one measure for AoA for signals at a sensor within a vehicle. Another measure of AoA that can be used with stationary infrastructure is related to the normalized Doppler reading of the received energy when read from a sensor on a moving vehicle. The normalized Doppler may be defined as Vr/Vh, where Vr is the range rate of an infrastructure object based on its sensed Doppler frequency read from the moving vehicle and Vh is the forward velocity of the host vehicle. The speed of the vehicle Vh can be determined from, for example, the speedometer of the vehicle or a GPS receiver within the vehicle.

The normalized Doppler reading may be used as a measure of the AoA with respect to the moving vehicle. While monopulse angle information may be sensitive to factors such as sensor mounting angle or other effects related to the sensor and its environment, the Doppler related angle information is relatively immune to these effects. Each range/Doppler bin within an array of bins has a corresponding Doppler speed. Thus, for each bin, a normalized Doppler reading can be calculated.

After the acquire functionality has been running for a sufficient amount of time, the analyze functionality may execute, wherein the DMI is analyzed to obtain statistics of the clutter ridge. The presence of a well-defined clutter ridge can be a strong indicator that the radar sensor is not blocked. The analyze functionality can determine the most likely location of the clutter ridge using the statistics of the image, across the entire field of view of the sensor, as well as monitor various metrics for each point along the clutter ridge. The quality metrics are used to determine the overall quality or confidence in the determination of the peak value of the clutter ridge for each point along the sensor's field of view. Varying levels of quality across the sensor's field of view will indicate the level of blockage as a function of azimuth.

The clutter ridge will integrate up over time in a repeatable, deterministic way from drive to drive. The shape of the clutter ridge, specifically as it deviates from the theoretical model, is determined by the sensor design factors (radome, antenna design, dielectric properties, etc.) as well as physical mounting constraints (surrounding frame design, bumper attributes, etc.). A clutter ridge signature can be determined for the integration of each sensor on the vehicle.

Once the desired clutter ridge statistics have been obtained, the apply stage can determine a blockage condition (i.e., unblocked, partially blocked, or fully blocked) based upon the statistics. An appropriate action can then be taken. In some embodiments, the blockage condition is communicated via the HMI bus 68 and/or the CAN bus 66. Another action that can be take, in some embodiments, is to disable one of the sensors 14, 15 (FIG. 1) as well as functionality that requires both sensors 14, 15 to be enabled.

In some embodiments, the blockage detection techniques described herein can utilize DMI and clutter ridge information generated as part of radar sensor self-calibration, such as the self-calibration techniques described in U.S. patent application Ser. No. 14/020,053, published on Mar. 12, 2015 as US Patent Publication No. 2015/0070207.

Figure 4A:
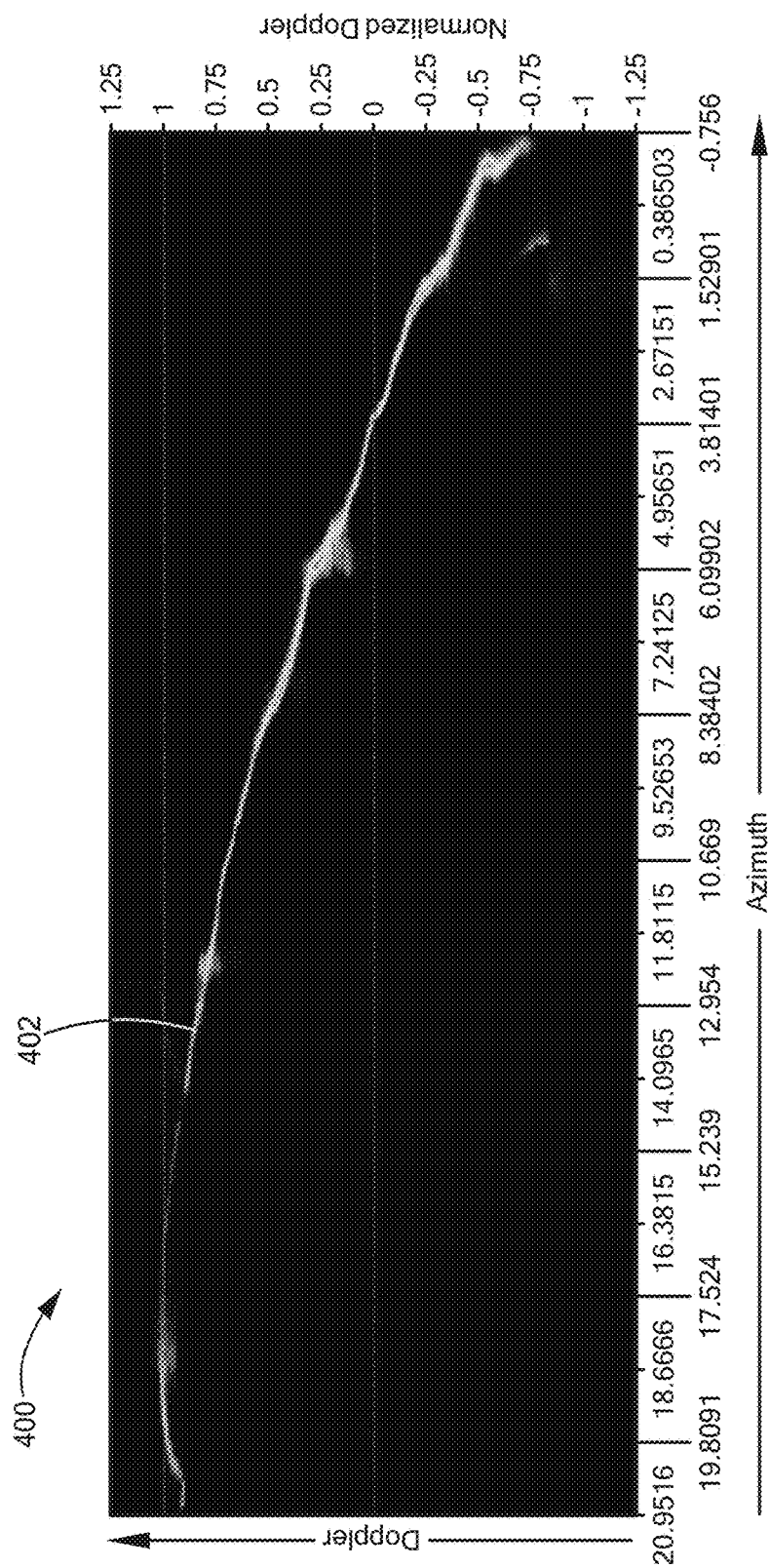
FIGS. 4A, 4B, and 4C (collectively referred to as FIG. 4) are diagrams illustrating Doppler Monopulse Images (DMI) that may be generated and used to detect blockages in a radar sensor, in accordance with an embodiment of the disclosure.
Figure 4B:
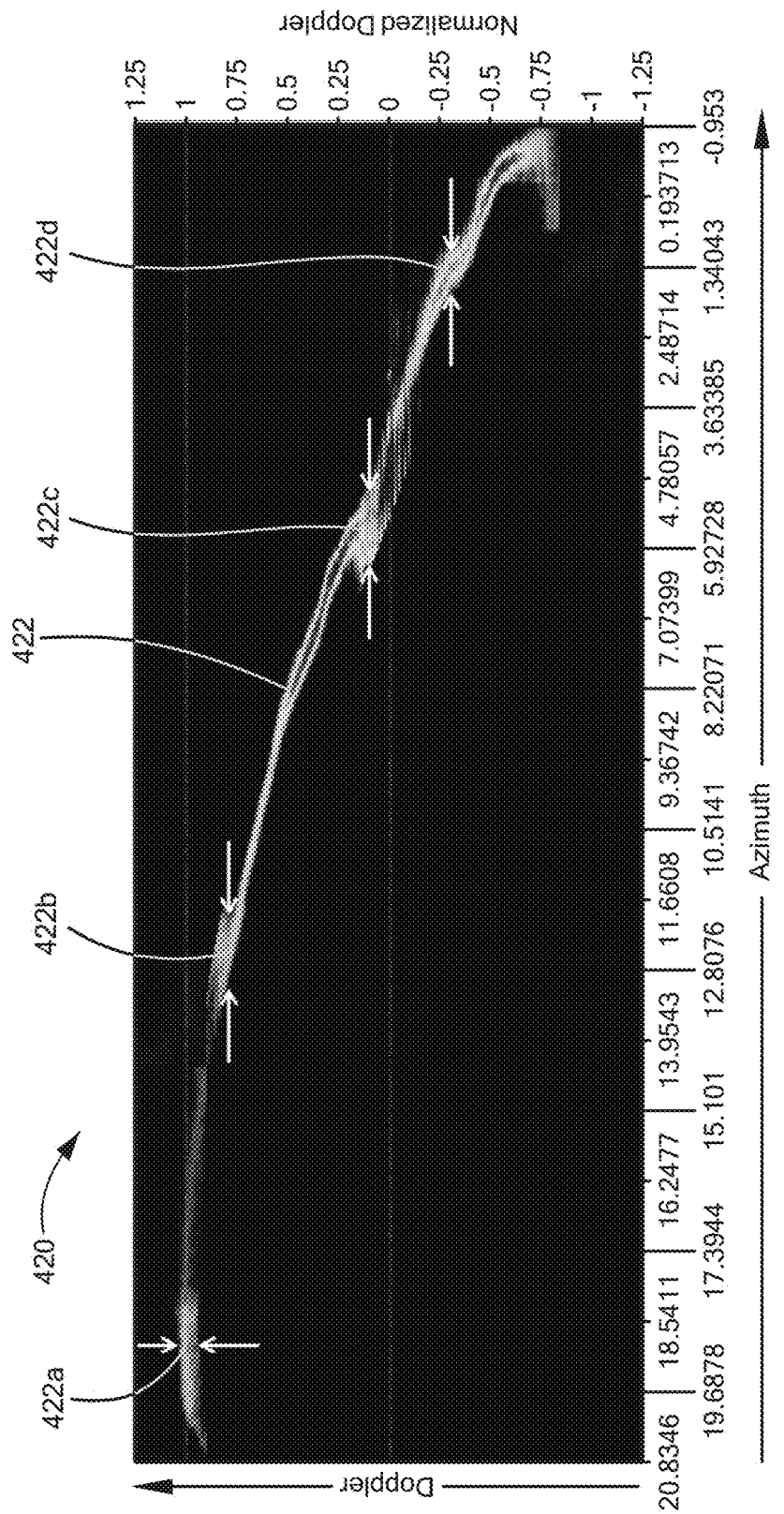
Figure 4C:
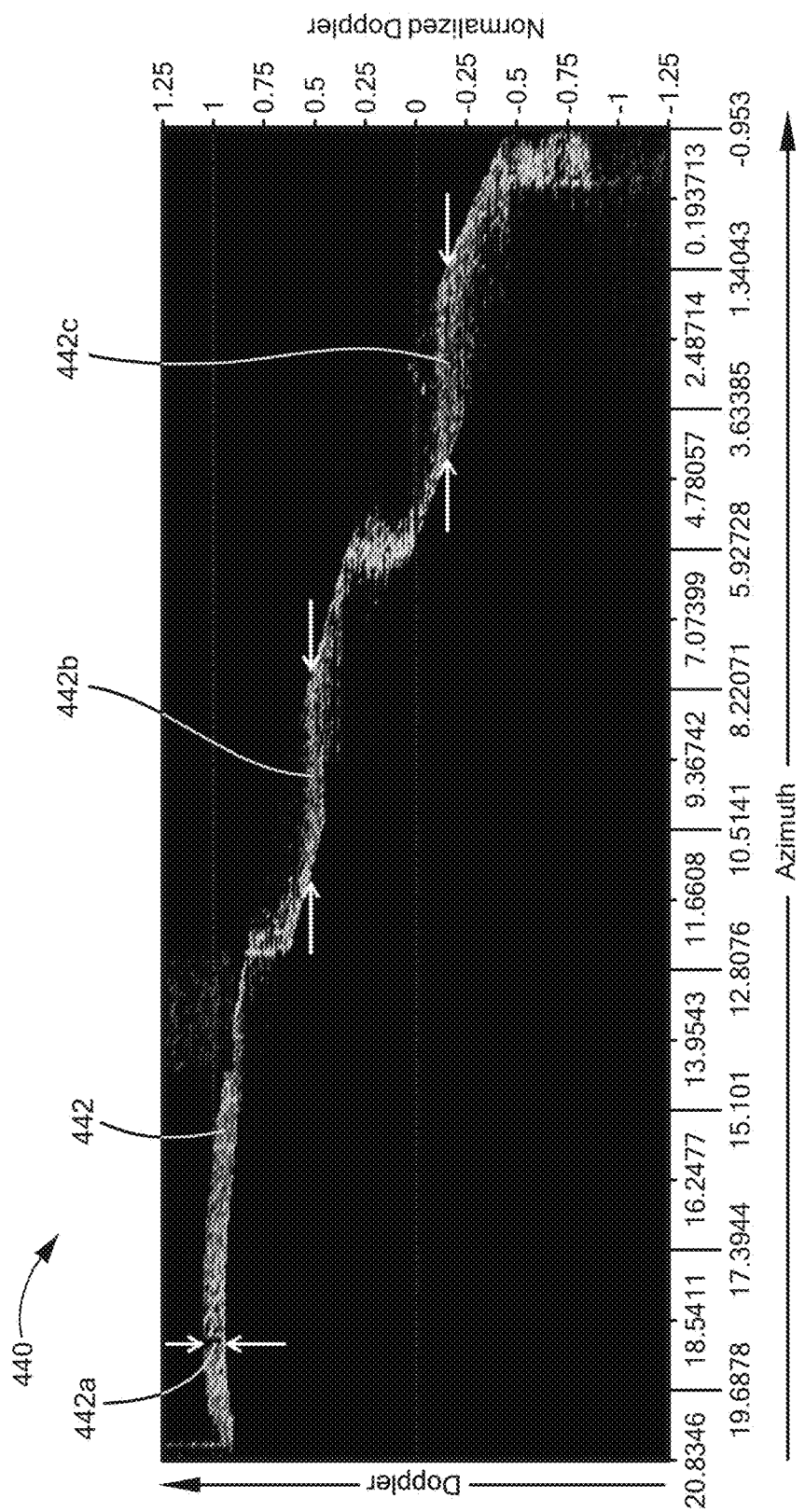

FIGS. 4A-4C are diagrams illustrating Doppler Monopulse Images (DMI) that may be generated using infrastructure readings of a sensor associated with a vehicle in accordance with some embodiments of the disclosure. The vehicle may be moving with respect to the infrastructure when the readings are taken. Within each of the figures, the horizontal axis represents monopulse angle (monopulse phase angle (MpA) or azimuth) and the vertical axis represents normalized Doppler (Vr/Vh).

As described above, for each range/Doppler bin in a two-dimensional array, both a monopulse angle and a normalized Doppler data may be generated. During data collection, data associated with all range/Doppler bins of received signals may be plotted on a DMI. In this regard, RF transmit signals may be continually transmitted to facilitate the data collection. If multiple transmit beams are used, signals may be transmitted within the different beams in some predefined order which can be repeated at a specific rate.

As points are added to a DMI, a clutter ridge may eventually develop within the image. A clutter ridge represents infrastructure about the moving vehicle. Each range-Doppler bin in the two-dimensional FFT may be mapped into a corresponding pixel of the DMI. As seen for example in FIG. 4A, a clutter ridge 402 may form between normalized Doppler values of +1 and −1. The shape of the clutter ridge generally follows the phase difference vs. azimuth phase curve. The presence of a clearly defined phase curve in a region of azimuth indicates no blockage in that region.

A DMI may use color or intensity to indicate variations in signal strength between different pixels. The signal strength (sometimes referred to as "magnitude" or "amplitude") of the different pixels may represent average signal strength, calculated over several measurements. In certain embodiments, each new value will get blended into the DMI using an Infinite Impulse Response (IIR) filter. This may include, for example, adding 1% of the new value in a pixel location to 99% of the previous value.

In some embodiments, a DMI may be represented as a three dimensional plot, with monopulse angle on an x-axis, normalized Doppler on a y-axis, and magnitude on a z-axis (i.e., an axis perpendicular to the page in FIGS. 4A-4C).

In general, each pixel of the DMI represents the signal power of the infrastructure object that returned that particular Doppler, monopulse angle, and strength. Strong signals have less noise and provide a better measurement of Doppler and monopulse angle. Weak signals or receiver noise generally have a random Doppler and monopulse angle. Averaging the signal strengths using an IIR technique improves the signal to noise ratio and allows the clutter ridge to build up over time. The more averaging allowed, the clearer the clutter ridge shape becomes, but the longer it takes to reach nearly final value. Long averaging times also increase the amount of time that less accurate data, such as data resulting from distorting effects of moving targets and/or rain, will be maintained. In some embodiments, the time constant of the IIR will be balanced between accuracy, response time, and the ability to forget bad data.

FIG. 4A shows an example of a DMI 400 that may be result from an unblocked sensor scenario. The DMI 400 includes clutter ridge 402 corresponding to static infrastructure data collected over a sufficient period of time while the host vehicle is moving. In contrast to FIGS. 4B and 4C (which are discussed below), the clutter ridge 402 in FIG. 4A is relatively well-defined over azimuth. This "well-defined" characteristic, which can be quantified as described below, can be used to determine that no blockage exists on the radar sensor.

FIG. 4B shows an example of a DMI 420 that may be result from a partially blocked sensor scenario. In contrast to the clutter ridge 402 of FIG. 4A, the clutter ridge 422 here is less well-defined and is said to have a lower "quality." The quality of a given clutter ridge can be quantified by using various metrics.

One possible quality metric that can be used is the peak magnitude in azimuth. At each of several normalized Doppler values (e.g., discrete values of normalized Doppler between +1 and −1), the peak magnitude in azimuth can be determined. In some embodiments, the peak magnitude is found using a Center of Mass calculation along azimuth for a given normalized Doppler value. If several peaks exist, a single peak is determined through the center of mass calculation. The peak values across normalized Doppler can then be averaged together to obtain a single quality metric.

Another possible quality metric that can be used is the variance of energy in azimuth. Variance can be seen as the "width" of the clutter ridge at given normalized Doppler values. For a given normalized Doppler, the width of the clutter ridge can be calculated as the distance between two points along the horizontal axis (e.g., in azimuth). For example, in FIG. 4B, the width of the clutter ridge at normalized Doppler≅0.75 may be indicated as the distance between arrows 442b.

In some embodiments, the width of the clutter ridge at a given normalized Doppler value is determined by selecting a magnitude threshold value and then finding the first and last points along the horizontal line that have a magnitude greater than or equal to the threshold value. If the DMI is represented as a three-dimensional plot, the width of the clutter ridge for a given normalized Doppler can be determined as the distance between the first and last points that where the magnitude of the clutter ridge intersects the threshold in the z-axis. Any suitable technique can be used to select the threshold value. In some embodiments, the threshold value may be calculated, for a given normalized Doppler, as an average magnitude in azimuth. Once two points are selected for a given normalized Doppler, the clutter ridge in azimuth can be determined as the distance therebetween. The per-Doppler clutter ridge widths can then be averaged together to obtain a single quality metric value.

It can be seen that the average width of clutter ridge 422 in FIG. 4B is greater than that of clutter ridge 402 in FIG. 4A. In particular, in FIG. 4B, the clutter ridge 422 is particularly wide for Doppler values approximately equal to 0.75, 0.2, and −0.25, as indicated by widths 422a, 422c, and 422d, respectively. The relative energy of the clutter ridge 422 in FIG. 4B is, on average, spread further in the horizontal direction (i.e., in azimuth) compared to the clutter ridge 402 of FIG. 4A. This may indicate that there is a larger noise component to the total signal used to determine the azimuth calculation of the FFT bin data.

In some embodiments, the width of the clutter ridge can be used to detect partial blockages and/or to distinguish between a partial blockage and a full blockage. In particular, wide variance of the clutter ridge for certain regions of the sensor's FoV, but not in other regions, can indicate a blockage in just those regions (or a greater blockage in those regions). For example, this situation could indicate that a sensor is unable to sense objects towards the rear of the vehicle, but is able to sense objects towards the front of the vehicle.

Yet another possible quality metric that may be used is the average stability of the peak magnitude in azimuth over time. For a given normalized Doppler value, the stability of the peak magnitude location in azimuth can be derived from the distance between the instantaneous peak location and the time-filtered peak location (i.e., the peak location determined using an IIR filter). Stability can be determined in inverse proportion to the distance (e.g., a larger distance may indicate a lower stability and vice-versa). An average stability can be calculated over several Doppler points. In some embodiments, stability can be measured over relatively short periods of time and/or over relatively long periods of time (i.e., either or both of short-term and long-term stability metrics can be used for blockage detection).

In FIG. 4B, the region denoted 422a may correspond to a partial blockage in azimuth. As can be seen, there may be a separation of data in azimuth due to the statistics of the data in the presence of heavy rain or other type of blockage. Such a blockage may also has the effect of attenuating the received signal.

FIG. 4C shows an example of a DMI 440 that may be result from a fully blocked sensor scenario. In contrast to FIGS. 4A and 4B, the clutter ridge 442 here is wider for most/all Doppler points. The clutter ridge is particularly wide in the azimuth ranges denoted 442b and 442c. Moreover, the average stability of the peak magnitude along azimuth may be significantly lower than in FIGS. 4A and 4B. These differences can indicate a full blockage.

In FIG. 4C, the region denoted 442a may be contrasted to the region 422a to distinguish between a partial and a full blockage. In the case of a full blockage (FIG. 4C), the signal attenuation may be significant enough to minimize the signal-to-noise ratio (SNR) to the point where azimuth is highly random. Because data may be acquired within a window of its expected azimuth, the result is a random distribution of energy within a windowed region of azimuth. In this case the statistics discussed above, a full blockage may result in the lowest total quality metric (smallest peak energy, largest variance, and lowest stability).

Figures 5A, 5B:
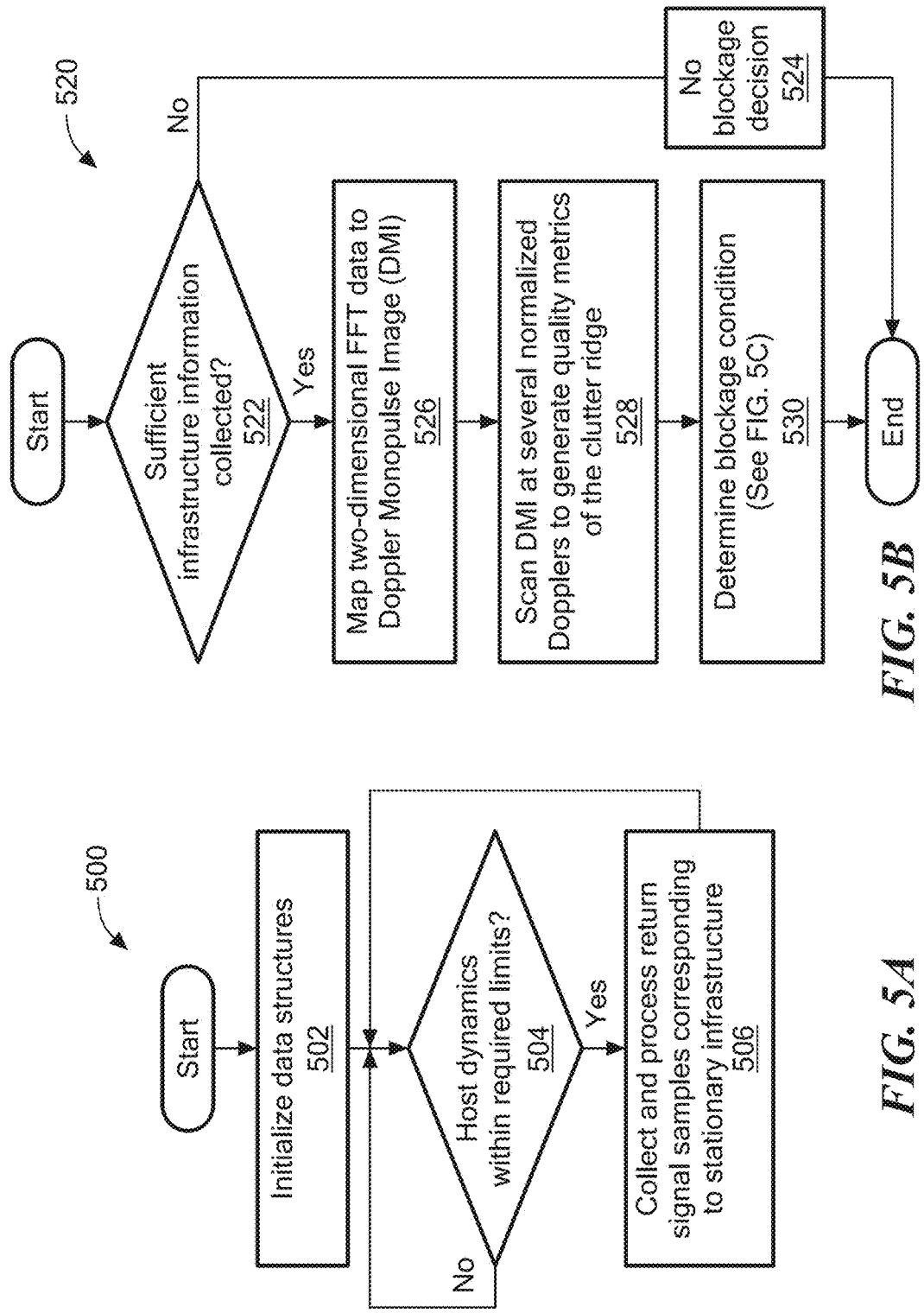
FIGS. 5A, 5B, and 5C (collectively referred to as FIG. 5) are flow diagrams showing illustrative processes according to one or more embodiments of the disclosure.
Figure 5C:
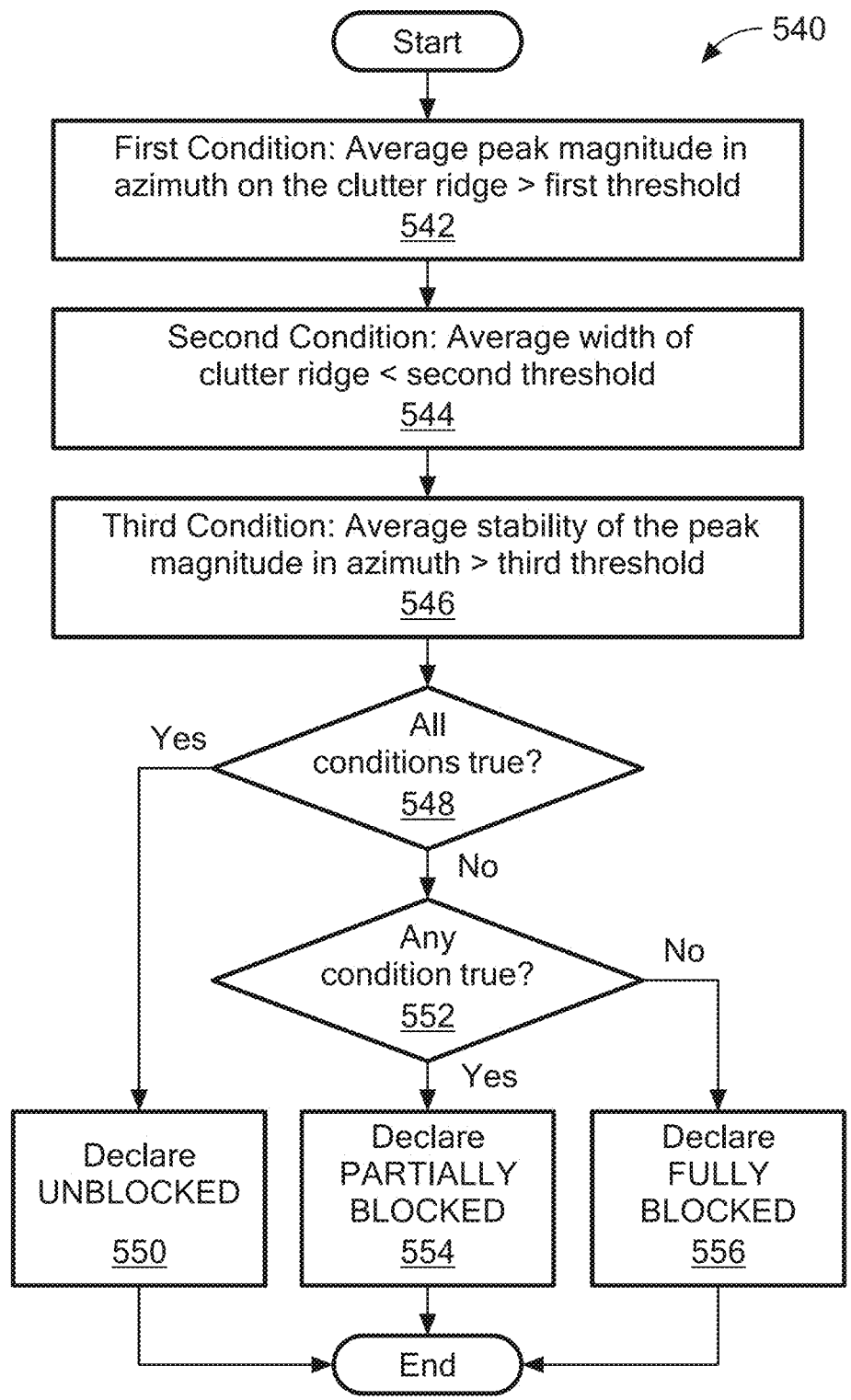

FIGS. 5A-5C are flow diagrams showing illustrative processing that can be implemented within the system 100 (FIG. 1). Rectangular elements (typified by element 502 in FIG. 5A), herein denoted "processing blocks," represent computer software instructions or groups of instructions. Diamond shaped elements (typified by element 506 in FIG. 5A), herein denoted "decision blocks," represent computer software instructions, or groups of instructions, which affect the execution of the computer software instructions represented by the processing blocks.

Alternatively, the processing and decision blocks may represent steps performed by functionally equivalent circuits such as a digital signal processor circuit or an application specific integrated circuit (ASIC). The flow diagrams do not depict the syntax of any particular programming language. Rather, the flow diagrams illustrate the functional information one of ordinary skill in the art requires to fabricate circuits or to generate computer software to perform the processing required of the particular apparatus. It should be noted that many routine program elements, such as initialization of loops and variables and the use of temporary variables are not shown. It will be appreciated by those of ordinary skill in the art that unless otherwise indicated herein, the particular sequence of blocks described is illustrative only and can be varied without departing from the spirit of the concepts, structures, and techniques sought to be protected herein. Thus, unless otherwise stated the blocks described below are unordered meaning that, when possible, the functions represented by the blocks can be performed in any convenient or desirable order.

Referring to FIG. 5A, an illustrative method 500 may correspond to acquire functionality, according to some embodiments. The method 500 may commence when the radar system is started up (e.g., as part of vehicle is turned on) and may continue until the radar system is shut down (e.g., when the vehicle is turned off).

At block 502, one or more data structures used for blockage detection are initialized. This may include a two-dimensional FFT. In some embodiments a clutter ridge data structure, indexed by normalized Doppler and azimuth (or phase difference), is also initialized.

At block 504, a determination is made whether the host dynamics are within certain limits required to obtain infrastructure information. In some embodiments infrastructure information should only be collected if the host vehicle speed is within a predetermined range. In certain embodiments, infrastructure information should only be collected only if the vehicle achieves a minimal speed and maximum yaw rate. If the host dynamics are within the required limits, return signal samples corresponding to stationary infrastructure around the vehicle may be acquired and processed (block 506). As described above, return signal samples may be processed in a two-dimensional FFT and used to develop a DMI.

Referring to FIG. 5B, an illustrative method 520 may correspond to analyze and apply functionality, according to some embodiments. At block 522, a determination is made whether sufficient infrastructure information has been collected. This may include determining if the radar system has been running for a minimum required amount of time. If insufficient information is available, no blockage decision can be made (block 524). Otherwise, at block 526, a DMI may be generated for analysis. In some embodiments, the clutter ridge analysis may also be gated based on whether non-static objects (e.g., moving vehicles) are within the radar sensor's field of view. In some embodiments, complex FFT bin data is converted to magnitude and phase angle. For the FFT bin data to be mapped to the DMI, the magnitude must be larger than a set threshold to guarantee that the data is well above the noise level. As described above, the DMI may be updated over time and, thus, block 526 may be considered part of the acquire stage.

At block 528, the DMI may be scanned at several normalized Doppler points (e.g., several points between −1 and +1) to generate quality metrics of the clutter ridge. In some embodiments, the generated quality metrics may include: (1) peak magnitude in azimuth; (2) variance of the clutter ridge in azimuth; and (3) stability of peak magnitude in azimuth. Each of these quality metrics is described in detail above in conjunction with FIGS. 4A-4C. In some embodiments, some but not all of these quality metrics may be generated.

At block 530, a blockage condition is determined using the clutter ridge statistics. An illustrative technique for determining a blockage condition is shown in FIG. 5C and described next.

FIG. 5C illustrates a method 540 for determining a blockage condition using clutter ridge statistics, according to some embodiments. The illustrated method calculates several quality metrics and then compares each of them with a respective threshold value. The result of the comparisons is used to make a blockage determination. In this particular example shown, three specific metrics are used, although it should be understood that different and/or additional metrics could be used.

At block 542, a first quality metric is calculated as the average peak magnitude in azimuth on the clutter ridge. The average peak magnitude may be compared against a first threshold value. An average peak magnitude exceeding the threshold can be an indicator of a well-defined clutter ridge.

At block 544, a second quality metric is calculated as the average width of the clutter ridge. The average width may be compared to a second threshold value. A wide clutter ridge can be an indicator of a blockage.

At block 546, a third quality metric is calculated as the average stability of the peak magnitude location azimuth. The average stability may be compared against third threshold value. A sustained condition of low stability can indicate a blockage.

As explained above, the clutter ridge will integrate up over time in a repeatable, deterministic way from drive to drive and its shape may be determined by the sensor design factors as well as physical mounting constraints. Thus, the first, second, and third threshold values may be determined based on the clutter ridge signature for a given vehicle/sensor integration. In some embodiments, the first threshold, which relates to average peak magnitude, can vary from sensor to sensor depending on a sensor's gain or sensitivity.

In certain embodiments, the second and third thresholds are generally fixed from sensor to sensor.

At block 548, if all the conditions (i.e., each of the conditions described above in conjunction with blocks 542, 544, and 546) are true, then a declaration may be made that the radar sensor is unblocked (block 550). Otherwise, if any condition is true (block 552), then a partial blockage may be declared (block 554). Finally, if none of the conditions are true, then a full blockage may be declared (block 556).

In some embodiments, when a partial blockage is declared, the corresponding azimuth where the blockage is detected may also be reported. This is possible because, as explained above, varying levels of quality across the sensor's field of view will indicate the level of blockage as a function of azimuth. The results of being blocked over certain azimuth regions are limited sensor field of view or regions of the full field of view that are deemed unreliable or low confidence for other processing of the radar sensor.

It should be appreciated that the blockage detection metrics and implementation shown in FIG. 5C are merely one example and that other metrics/implementations can be used. For example, in some embodiments, a "total quality" metric is calculated for the clutter ridge. The total quality may be calculated as a weighted sum of several quality metrics at several normalized Doppler values (e.g., discrete values between +1 and −1). Examples of metrics that can be factored into the total quality include: (1) peak magnitude in azimuth; (2) width of the clutter ridge; (3) number of valid updates for each azimuth; (4) short-term stability of peak energy in azimuth; and/or (5) long-term stability of peak energy in azimuth. The level of blockage can be determined as the inverse of total quality.

It will be appreciated that blockage detection techniques described herein utilize energy plots in the Normalized Doppler vs. Phase difference space. Alternative coordinate systems could be used such as Doppler Azimuth vs. Monopulse azimuth. Both types of plots project three-dimensional radar data along the range axis using time integration. Other types of projections could also be used. For example, a projection operation could collapse the clutter ridge along the Doppler or azimuth axis to form a one-dimensional histogram of the clutter peak, which could then be analyzed (e.g., measuring the peak height and width as an estimate for the lack of blockage). Moreover, the blockage detection concepts and structures sought to be protected herein are not limited to the generation of imagery or plots. For example, incremental algorithms for estimating the peak of the clutter in one or two dimensions that do not require forming an image in memory for later analysis could be used.

Figure 6:
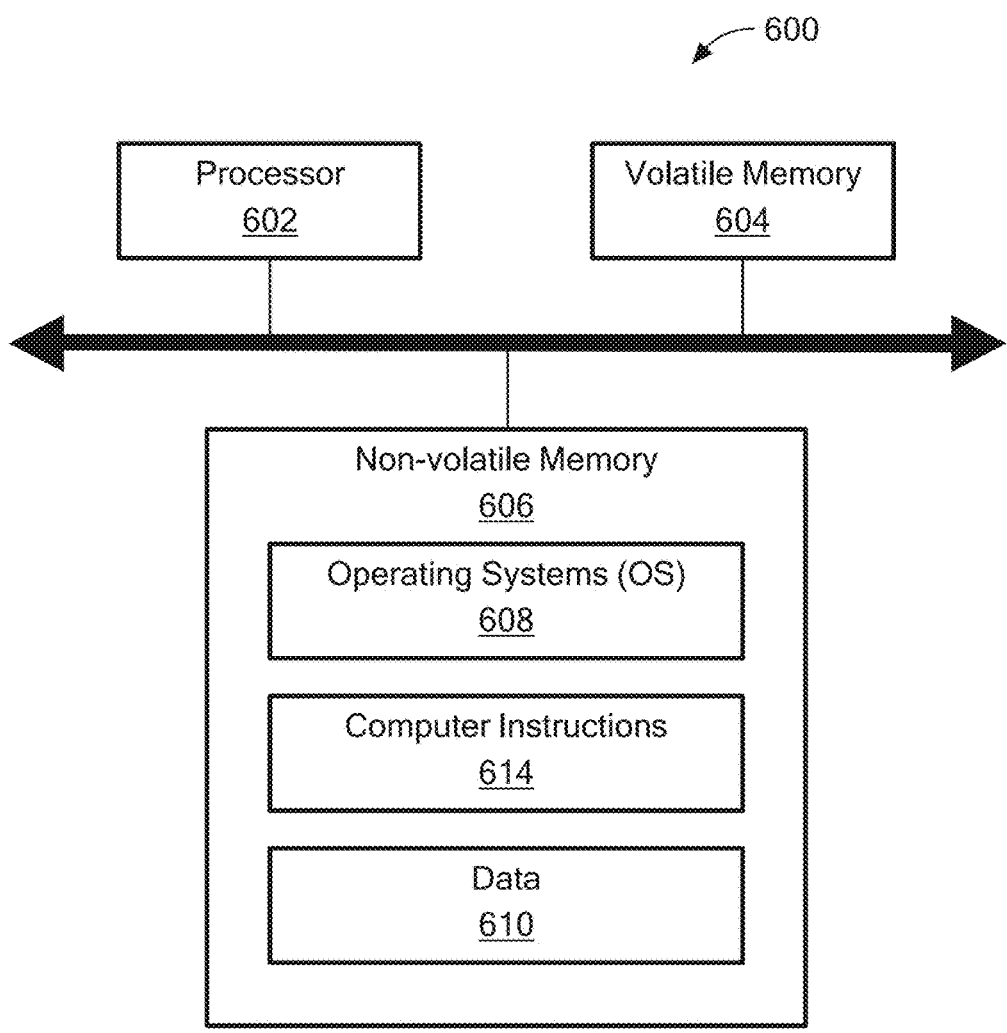
FIG. 6 is a block diagram of a processing system capable of performing blockage detection processing in accordance with an embodiment of the disclosure.

Referring to FIG. 6, a processing system 600 (e.g., a computer) may include a processor 602 and a volatile memory 604, a non-volatile memory 606 (e.g., a flash memory). Non-volatile memory 606 stores operating system 608 and data 610. Non-volatile memory 606 also stores computer instructions 612, which are executed by processor 602 out of the volatile memory 604 to perform all or part of processes described herein (e.g., the processing described above in conjunction with FIGS. 1-6).

It should be appreciated that all or part of processes, method, and techniques described herein are not limited to use with the hardware and software of FIG. 6; it may find applicability in any computing or processing environment and with any type of machine that is capable of running a computer program. All or part of the processes described herein may be implemented in hardware, software, or a combination of the two. All or part of the processes described herein may be implemented in computer programs executed on programmable computers/machines that each includes a processor, a storage medium or other article of manufacture that is readable by the processor (including volatile and non-volatile memory and/or storage elements). Program code may be applied to data entered using an input device to perform all or part of the processes described herein and to generate output information.

The system may be implemented, at least in part, via a computer program product (i.e., a computer program tangibly embodied in an information carrier (e.g., in a machine-readable storage device or in a propagated signal, for execution by, or to control the operation of, data processing apparatus (e.g., a programmable processor, a computer, or multiple computers)). Each such program may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a storage medium or device (e.g., CD-ROM, hard disk, or magnetic diskette) that is readable by a general or special purpose programmable computer for configuring and operating the computer when the storage medium or device is read by the computer to perform all or part of the processes described herein. All or part of the processes described herein may also be implemented as a machine-readable storage medium, configured with a computer program, where upon execution, instructions in the computer program cause the computer to operate in accordance with all or part of the processes described herein.

Having described certain embodiments, which serve to illustrate various concepts, structures, and techniques sought to be protected herein, it will be apparent to those of ordinary skill in the art that other embodiments incorporating these concepts, structures, and techniques may be used. Elements of different embodiments described hereinabove may be combined to form other embodiments not specifically set forth above and, further, elements described in the context of a single embodiment may be provided separately or in any suitable sub-combination. Accordingly, it is submitted that scope of protection sought herein should not be limited to the described embodiments but rather should be limited only by the spirit and scope of the following claims.

All references cited herein are hereby incorporated herein by reference in their entirety.

What is claimed is:

1. In a vehicle radar sensor, a method for detecting radar sensor blockage, the method comprising:

collecting sensor data using the radar sensor as the vehicle travels past stationary structures;

generating a plot of normalized Doppler versus monopulse angle using the collected sensor data, wherein the plot includes a clutter ridge comprising points representative of the stationary structures, wherein the plot indicates signal magnitude at different points of normalized Doppler and monopulse angle;

analyzing the plot to detect if the radar sensor is blocked by calculating one or more quality metrics for the clutter ridge, wherein calculating the one or more quality metrics for the clutter ridge comprises at least one of:
  calculating an average peak magnitude in azimuth,
  calculating an average variance of the clutter ridge in azimuth, and
  calculating average stability of peak magnitude in azimuth; and
providing a signal to at least one of:
  a Controller Area Network (CAN) in response to detecting a radar sensor blockage, and
  a human/machine interface (HMI) in response to detecting the radar sensor blockage.

2. The method of claim 1 wherein generating a plot of normalized Doppler versus monopulse angle comprises generating the plot based on range/Doppler bins associated with the collected sensor data.

3. The method of claim 1 wherein analyzing the plot to detect if the radar sensor is blocked comprises detecting a partial blockage or a full blockage.

4. The method of claim 1 wherein analyzing the plot to detect if the radar sensor is blocked comprises analyzing the plot in azimuth for a plurality normalized Doppler values.

5. The method of claim 1 further comprising:
  comparing each of the quality metrics to a respective threshold value to detect if the radar sensor is blocked.

6. A radar detection system for use in a vehicle, the system comprising:
  an RF transmitter to generate radio frequency (RF) transmit signals;
  a transmit antenna to transmit the RF transmit signals;
  one or more antennas to receive return signals representing reflections of the RF transmit signals from objects and structures within a region of interest about the vehicle;
  one or more analog-to-digital converters to digitize signals associated with the first and second receive antennas, respectively; and
  a blockage detection processor configured to:
  collect sensor data using the radar sensor as the vehicle travels past stationary structures;
  generate a plot of normalized Doppler versus monopulse angle using the collected sensor data, wherein the plot includes a clutter ridge comprising points representative of the stationary structures, wherein the plot indicates signal magnitude at different points of normalized Doppler and monopulse angle; and
  analyze the plot to detect if the radar sensor is blocked calculating one or more quality metrics for the clutter ridge, wherein calculating the one or more quality metrics for the clutter ridge comprises at least one of:
    calculating an average peak magnitude in azimuth,
    calculating an average variance of the clutter ridge in azimuth, and
    calculating average stability of peak magnitude in azimuth.

7. The radar detection system of claim 6 wherein the blockage detection processor is configured to generate the plot based on range/Doppler bins associated with the collected sensor data.

8. The radar detection system of claim 6 wherein the blockage detection processor is configured to detect a partial blockage or a full blockage.

9. The radar detection system of claim 6 wherein the blockage detection processor is configured to analyze the plot in azimuth for a plurality normalized Doppler values.

10. The radar detection system of claim 6 wherein the blockage detection processor is further configured to compare each of the quality metrics to a respective threshold value to detect if the radar sensor is blocked.

11. The radar detection system of claim 6 wherein the vehicle includes a Controller Area Network (CAN), wherein the blockage detection processor is further configured to provide a signal to the CAN in response to detecting a radar sensor blockage.

12. The radar detection system of claim 6 wherein the vehicle includes a human/machine interface (HMI), wherein the blockage detection processor is further configured to provide a signal to the HMI in response to detecting a radar sensor blockage.

* * * * *